United States Patent [19]

Class et al.

[11] Patent Number: 4,524,843
[45] Date of Patent: Jun. 25, 1985

[54] SPEED GOVERNOR FOR MOTOR VEHICLES

[75] Inventors: Eberhard Class, Geislingen; Heiner Schweizer, Bad Überkingen; Günther Frank, Eislingen/Fils, all of Fed. Rep. of Germany

[73] Assignee: ULO-Werk Moritz Ullmann GmbH & Co. KG, Geislingen/Steige, Fed. Rep. of Germany

[21] Appl. No.: 281,178

[22] Filed: Jul. 7, 1981

[30] Foreign Application Priority Data

Jul. 11, 1980 [DE] Fed. Rep. of Germany ....... 3026423

[51] Int. Cl.$^3$ ............................................. B60K 31/00
[52] U.S. Cl. ................................. 180/179; 123/352; 261/44 B
[58] Field of Search ............. 180/178, 179, 170, 219; 123/356, 355, 354, 353, 352, 361; 261/44 B, DIG. 74

[56] References Cited

U.S. PATENT DOCUMENTS

| 3,804,193 | 4/1974 | Ikuta | 123/352 |
| 4,044,080 | 8/1977 | Matsumoto | 261/44 B |
| 4,086,888 | 5/1978 | Roberts | 123/352 |
| 4,363,973 | 12/1982 | Kawata | 180/170 |

FOREIGN PATENT DOCUMENTS 137599 1/1920 United Kingdom ............. 261/44 B

Primary Examiner—David M. Mitchell
Assistant Examiner—Joseph G. McCarthy
Attorney, Agent, or Firm—Burns, Doane, Swecker & Mathis

[57] ABSTRACT

Apparatus for limiting the speed of motor vehicles, especially small motorcycles, which have a carburetor provided with a fuel control element, wherein the fuel control element is responsive both to a signal generated by the driver and to an automatic control system which is responsive both to engine speed and vehicle speed. A displaceable stop member for limiting speed increasing displacement of the control element is driven by a servomotor controlled by a bridge switch circuit which is responsive to a comparison between control signals derived, respectively, from the position of the control element and the engine or vehicle speed. In the absence of a vehicle speed signal, an electronic switch automatically couples engine speed control signals to the bridge circuit.

15 Claims, 5 Drawing Figures

SPEED GOVERNOR FOR MOTOR VEHICLES

FIELD OF THE INVENTION

The present invention relates in general to speed limiting governors for motor vehicles, and in particular to speed governors for small motorcycles having carburetors with a final control element regulating the supply of fuel.

BACKGROUND OF THE INVENTION

Government regulations in various jurisdictions make it necessary to limit the maximum speed obtainable by motor vehicles, particularly motorcycles with small, two-stroke engines.

One conventional approach to limiting the speed of motorcycles with carburetor equipped engines achieves a power reduction and thus a speed limitation by adjusting the fuel-air mixture so that it is too rich above a predetermined speed. This approach suffers from a number of disadvantages, however. A principle disadvantage is that gasoline consumption and pollution emissions are increased at high rotational speeds. Further, engines so tuned do not operate in a optimum power range at low rotational speeds since the starting torque is relatively low. Another serious disadvantage is that the tuning of such engines can be relatively easily changed to increase the limiting speed.

Another conventional approach to limiting the speed of motorcycles entails interrupting the ignition when a predetermined rotational speed is reached. In addition to achieving only a rotational engine speed limitation, and not actually a vehicle speed limitation, this approach suffers from the fact that it involves a jerky reduction in speed due to misfiring, and thus impairs the safety of the driver.

SUMMARY OF THE INVENTION

It is therefore an object of the present invention to provide a speed governing system for motor vehicles, and especially small motorcycles, which is not subject to tampering, which does not impair the efficient operation of the engine, and which avoids the production of additional pollution and increases in fuel consumption.

It is a further object of the present invention to provide a speed governing system which reduces the noise associated with small motorcycle engines.

These and other objects are obtained in accordance with the present invention, wherein the fuel control element of the carburetor is responsive both to actuation by a vehicle drive and to an automatic control system for limiting the response of the control element to drive actuation which is vehicle speed and engine speed dependent. In accordance with the present invention, a vehicle driver can himself regulate the vehicle speed in a conventional manner, such as by means of a throttle, but only until a certain preset speed is reached. So long as the speed limit has not been reached, the fuel control element is subject to the control of the vehicle driver. Once the speed limit has been reached, the fuel control element is controlled by the automatic control system in such a way that further adjustment of the fuel control element in a speed increasing direction cannot be accomplished.

In accordance with one aspect of the present invention, a conventional carburetor jet needle constitutes the fuel control element and is connected to a slide member disposed within the carburetor housing. The speed which the vehicle driver desired to reach can be determined either by monitoring the position of the slide member or by monitoring the actuation of the throttle control.

In accordance with a further aspect of the present invention, the automatic control system comprises apparatus for controlling the speed increasing displacement of the sliding member and an electronic switch system responsive both to engine speed and vehicle speed for controlling the displacement controlling apparatus. The displacement controlling apparatus advantageously comprises an axially displaceable stop member which is driven by a servomotor controlled by the switch system.

In accordance with a still further aspect of the present invention, either a single slide member which is continuously controlled by the servomotor, or a pair of slide members can be employed. If two slide members are employed, the slide members are coaxially disposed with respect to each other and are connected together by a spring. The throttle linkage is connected to a first one of the slide members and the control element is connected to a second one of the slide members. The automatic control system controls the displacement of the second sliding member such that the second sliding member is prevented from further speed increasing displacement even though the first sliding member is displaced in such a direction.

In accordance with another aspect of the present invention, the electronic switch system comprises first and second converters which convert engine speed and vehicle speed, respectively, into engine speed control signals and vehicle speed control signals. The first and second converters are connected to the displacement controlling apparatus by electronic switch apparatus which advantageously comprises a transistor switch responsive to the presence of the vehicle speed control signals for disabling the first converter.

In accordance with a further aspect of the present invention, the automatic control system includes a bridge switching system for controlling the servomotor which is responsive to the difference between the engine speed or vehicle speed control signals and the output of the sensor monitoring the position of the slide member.

These and other features of the present invention will be disclosed and are apparent from the following detailed description of preferred embodiments.

BRIEF DESCRIPTION OF THE DRAWING

The preferred embodiment will be described with reference to the drawing, in which like elements have been denoted with like reference numerals throughout the figures.

DETAILED DESCRIPTION OF THE PREFERRED EMBODIMENTS

Figure 1:
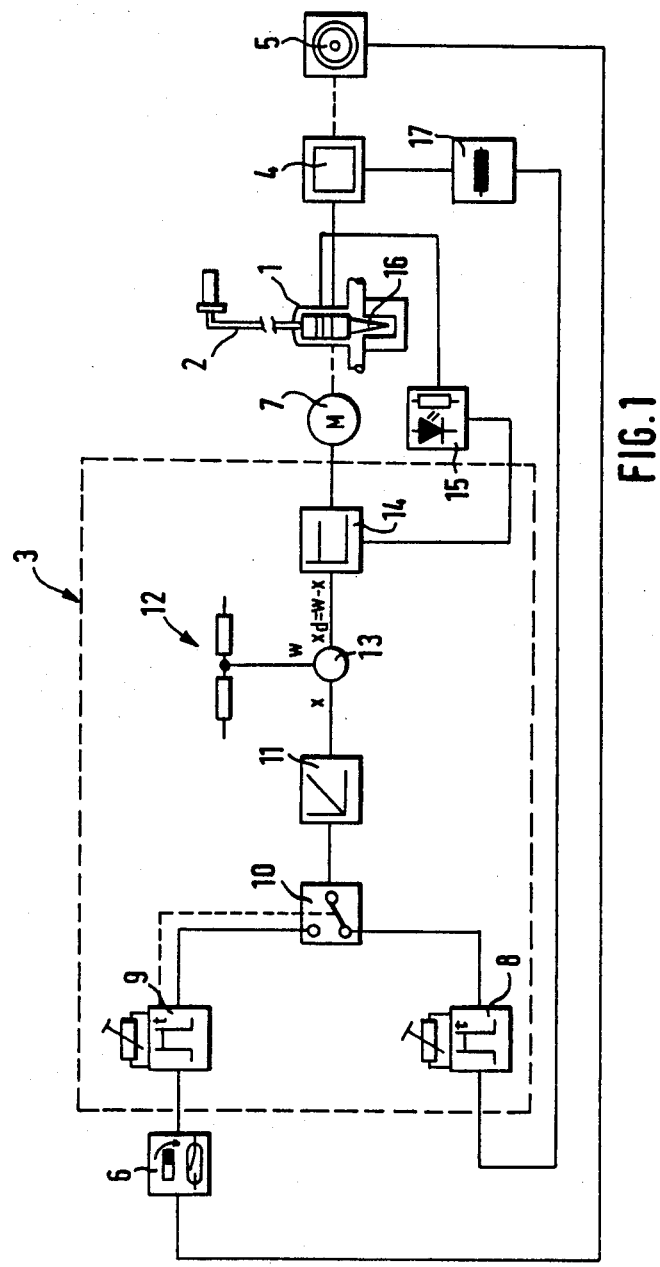
FIG. 1 is a schematic block diagram of a vehicle speed limiting system constructed in accordance with the present invention.

Referring to FIG. 1, a vehicle speed limiting system constructed in accordance with the present invention includes a carburetor 1 forming a part of a conventional gasoline engine 4 which powers a vehicle. Carburetor 1 comprises a control element 16 which regulates the flow of fuel. Carburetor control element 16 is controllable both by a driver actuated throttle linkage 2 and by a servomotor 7 which is automatically actuated by an electronic switch system, generally denoted 3. The position of carburetor control element 16 determines the speed at which engine 4 drives the vehicle, which vehicle speed advantageously is measured from the rotation of a vehicle wheel 5 by a speedometer 6 producing a digital output signal. It will be appreciated by those of ordinary skill in the art that the vehicle speed can also be monitored by means of conventional contactless sensors (not shown), such as, for example, sound or photoelectric sensors, magnetic sensors or inductive transmitting coils, mounted on the transmission or rear axle of the vehicle. The use of such sensors renders tampering with the system more difficult than is the case when the speedometer is used to sense vehicle speed.

Switching system 3 comprises first and second frequency-to-voltage converters 8 and 9. The input of converter 8 is connected to the output of a generator 17 mounted on engine 4, the output of which corresponds to the rotational speed of engine 4. The input of converter 9 is connected to the output of speedometer 6. The ignition coil typically provided on conventional gasoline engines, advantageously constitutes generator 17. The outputs of converters 8 and 9 are connected via a switching network 10, which gates either the output signals produced by circuit 9, or the output signals produced by circuit 8 if no output is being produced by circuit 9 to a smoothing circuit 11 which eliminates the fluctuations typically present in the output signals produced by conventional speedometers and ignition coils. The output of circuit 11 is compared with a reference voltage 12 in a conventional differential amplifier 13 which produces an ouput singal corresponding to the difference between voltage 12 and the output of circuit 11. Reference voltage 12 advantageously is variable in order to scale the output of amplifier 13 to match the vehicle operating parameters and the switching system components. The output of amplifier 13 is connected as one input to a bridge switch drive circuit 14 which produces control signal outputs to drive servomotor 7. A conventional sensor 15 monitors the position of control element 16 and produces an output signal corresonding thereto which is connected to drive circuit 14 as an input.

The speed limiting system of the present invention preferably operates in the following manner. As long as the vehicle is not moving, speedometer 6 produces no output signal. Consequently, the output of converter 8, which corresponds to the rotational speed of engine 4, is conducted by switching network 10 to smoothing circuit 11, and the converted analog signal corresponding to the rotational speed of engine 4 is compared with reference voltage 12 in amplifier 13. A driver can actuate control element 16 by means of throttle linkage 2 to increase the rotational speed of engine 4 so long as the corresponding analog signal produced by circuit 11 does not exceed the reference voltage 12. If the analog signal produced by circuit 11 exceeds the reference voltage 12, a speed limiting signal is generated by drive circuit 14 which actuates servomotor 7 to prevent speed increasing displacement of control element 16 by means of throttle linkage 2 beyond a predetermined position.

When the vehicle is moving and the speedometer is connected, converter 9 produces an output, which is conducted by switching network 10 to circuit 11 while the output of converter 8 is blocked. The vehicle speed dependent analog signal produced by circuit 11 is utilized in the same manner described above as the engine speed dependent analog signal produced from the output of converter 8 to actuate drive circuit 14. Consequently, regulation of control element 16 is independent of the engine rotational speed, and the engine can be tuned so as to optimize power throughout the driving range and minimize pollution emissions and gasoline consumption at high rotational speeds. Further, larger volume engines can be employed with small motorcycles, which can be operated in a lower rotational speed range at noise levels much lower than those associated with small high rotational speed engines. It will also be apparent from the foregoing that when a vehicle equipped with the speed limiting system of the present invention is idling, excessive engine speeds are prevented, which greatly reduces noise pollution. Moreover, attempts to tamper with the speed limiting system by disconnecting the speedometer are thwarted since the system automatically switches to the engine rotational speed signal produced by converter 8 to control the position of control element 16. The engine rotational speed can thus be limited to a value which is less than the engine speed necessary to obtain the maximum permitted vehicle speed in the highest transmission gear.

Figure 2:
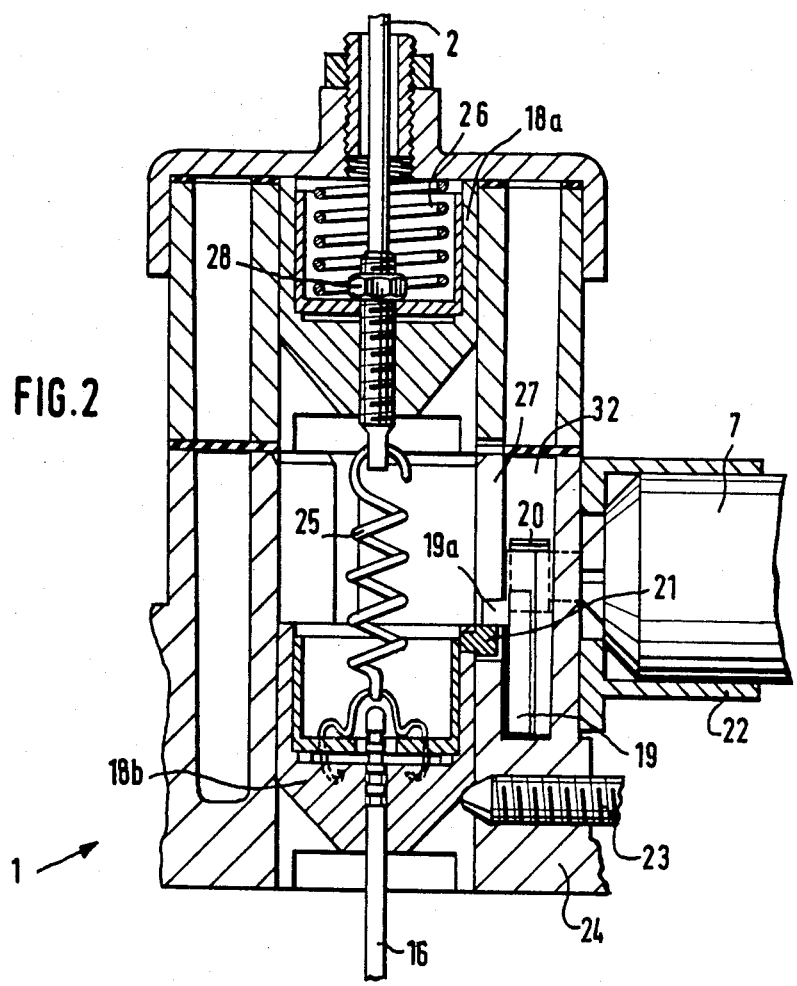
FIG. 2 is a partial longitudinal cross section of a portion of a first embodiment of a carburetor constructed in accordance with the present invention.

Referring to FIG. 2, a preferred embodiment of a carburetor constructed in accordance with the present invention comprises first and second slide members 18A and 18B, respectively, coaxially disposed with respect to each other and slidably mounted within a carburetor housing 24. Both slide members 18A and 18B are displaceable within housing 24 and are connected together by a spring 25. Throttle linkage 2 is connected to slide member 18A by means of a connecting screw 28. Upward displacement of slide member 18A in a speed increasing direction is resisted by the compressive force of a second spring 26 disposed, as shown, axially between housing 24 and slide member 18A. Carburetor control element 16, which advantageously is in the form of a conventional carburetor jet needle, is connected to slide member 18B. The lowest position of slide member 18B, and hence of control element 16, which corresponds to an idle setting, advantageously is adjusted by means of an idling adjustment set screw 23 which engages an inclined surface on slide member 18B, as shown. Servomotor 7 is mounted on the carburetor by means of a mounting flange 22 and is coupled to slide member 18B by a rack and pinion arrangement mounted in a chamber 32 provided in carburetor housing 24. The rack and pinion arrangement advantageously comprises a pinion 20 driven by servomotor 7 and a rack 19 disposed for axial displacement parallel to the displacement of slide member 18B. A cam 19A projecting from rack 19 and extending into a recess 27 in carburetor housing 24 cooperates with a projecting pin 21 provided on slide member 18B which similarly extends into recess 27 such that the position of rack 19 governs the maximum upward displacement of slide member 18B in a speed increasing direction toward slide member 18A. It will be appreciated that servomotor 7 can be quite small and need not possess a high starting torque since the slide member arrangement of the present invention is easily displaced without a large amount of force.

In the absence of the speed limiting signal produced by drive circuit 14, servomotor 7 is actuated so as to position cam 19A in an upper position, (not shown), wherein slide members 18A and 18B can move conjointly in contact with each other. It will be appreciated that when throttle linkage 2 is not actuated, slide member 18A is urged toward and into contact with slide member 18B by string 26, and slide member 18B is in the lowermost, idling position thereof, as determined by screw 23. When throttle linkage 2 is actuated by the vehicle driver, both slide members 18A and 18B are shifted as a unit, causing control element 16 to be adjusted accordingly, unless the vehicle reaches the predetermined maximum speed therefor, if the vehicle transmission has been engaged, or unless engine 4 reaches the predetermined maximum rotational velocity therefor, if the vehicle transmission has not been engaged. When a speed limiting signal is then generated by drive circuit 14, servomotor 7 is actuated to displace rack 19 toward slide member 18B until cam 19A is in a predetermined position which prevents further upward displacement of slide member 18B in the speed increasing direction toward slide member 18A. With cam 19A so positioned, a further actuation of throttle linkage 2 by the vehicle driver in an effort to increase the engine/vehicle speed merely results in the separation of slide member 18A from slide member 18B with no change in the position of slide member 18B, and thus no increase in speed.

Figure 3:
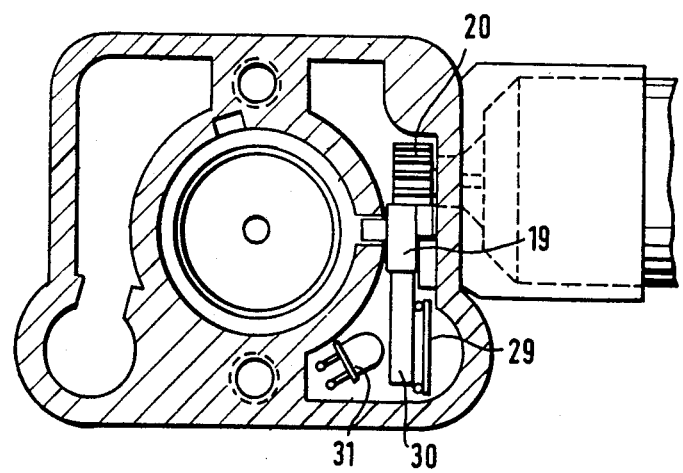
FIG. 3 is a schematic transverse partial cross-section of a portion of a second embodiment of a carburetor constructed in accordance with the present invention.

Referring to FIG. 3, sensor 15 advantageously comprises a light-emitting diode or other conventional light source 31, a photoresistor or other conventional photosensitive element 29, a movable light barrier element 30 coupled to slide member 18B so as to block the light path defined between source 31 and element 29 in proportion to the axial position of slide member 18B. Advantageously, element 30 is coupled to slide member 18B such that the minimum light blockage occurs when slide member 18B is in the uppermost position thereof. As will be apparent to those of ordinary skill in the art, source 31 and element 29 advantageously are housed in a conventional manner in carburetor housing 24 and barrier element 30 advantageously is mechanically connected to slide member 18B in a conventional manner. It will also be appreciated by those of ordinary skill in the art that sensor 15 advantageously can comprise any conventional type of electronic sensor, such as, for example, a potentiometer circuit.

Figure 4:
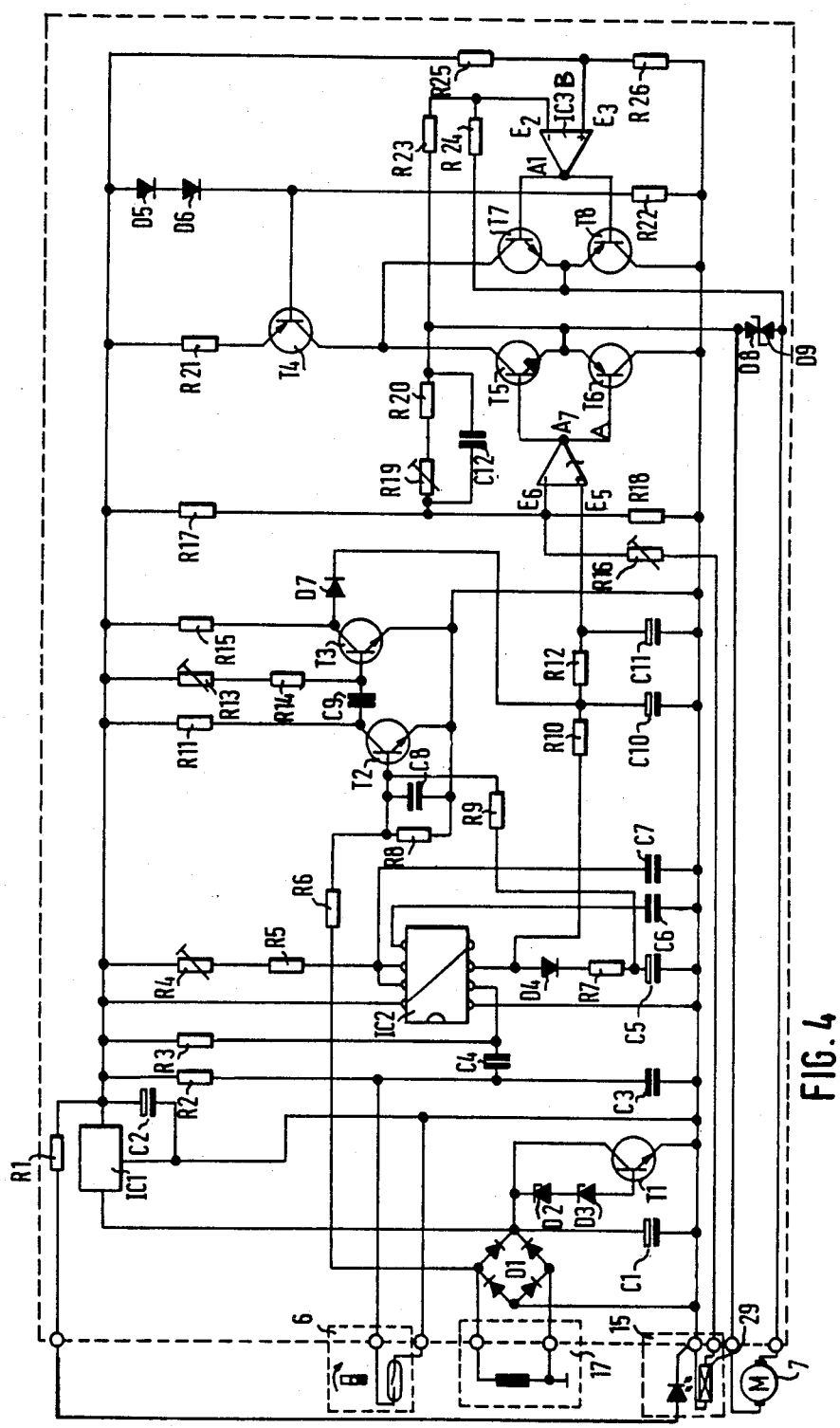
FIG. 4 is a schematic circuit diagram of electronic control apparatus constructed in accordance with the present invention.

Referring to FIG. 4, a practical implementation of switch system 3 which is adapted to be powered from the available alternating current of the vehicle comprises a rectifier bridge D1 and a filter capacitor C1 for rectifying the alternating voltage, transistor T1 and Zener diodes D2 and D3 for limiting the rectified voltage, and a conventional intergrated circuit voltage regulator IC1 and associated capacitor C2 for providing a stabilized supply voltage. With the various components listed below, limiting the rectified voltage to 30 volts and providing a 10 volt regulated supply voltage have proven advantageous.

Frequency-to-voltage converter 9 of FIG. 1 advantageously is implemented by a conventional integrated circuit frequency-to-voltage converter IC2, which has associated therewith biasing resistors R2, R3, R4, and R5, coupling capacitors C4 and C5, and biasing capacitors C6 and C7. Converter 8 of FIG. 1 advantageously is implemented by a second conventional frequency-to-voltage converter comprising transistors T2 and T3, resistors R6, R8, R11, R13, R14 and R15, and capacitors C8 and C9 connected as shown. Advantageously, resistors R4 and R13 are variable, as shown, to allow variation of the respective conversion factors of converters 9 and 8, and thereby allow accomodation of the system to different engines and vehicles.

Switching network 10 of FIG. 1 advantageously is implemented by coupling the output of converter IC2 to the input of transistor T2 as a cut-off biasing signal. More specifically, as shown, a blocking diode D4, biasing resistor R7 and capacitor C5 are connected in series between the converter IC2 output and ground, and the base of transistor T2 is connected to the junction of resistor R7 and capacitor C5 via a biasing resistor R9. As will be apparent to those of ordinary skill in the art, when an output signal is produced by converter IC2, corresponding to the existence of an output from speedometer 6, transistor T2 is biased off, and when no output is produced by converter IC2, transistor T2 is biased on by the output from engine rotational speed sensor 17, because capacitor C5 get's charged.

Smoothing circuit 11 of FIG. 1 advantageously is implemented by a filter circuit comprising resistors R10 and R12 and capacitors C10 and C11. The output of converter IC2 is connected directly to resistor R10, and the output of transistor T3 is connected via a blocking diode D7 to the junction of resistors R10 and R12.

Drive circuit 14 and differential comparator 13 of FIG. 1 advantageously is implemented by a bridge switching circuit comprising a comparator switch IC3A and a comparator switch IC3B which respectively control drive amplifiers connected to opposing inputs of servomotor 7 such that switch IC3A controls displacement of cam 19A toward slide member 18B, and switch IC3B controls displacement of cam 19A away from slide member 18B. One input E5 of switch IC3A is connected to the junction of resistor R12 and capacitor C11, thereby receiving engine/vehicle speed dependent control signals produced by system 3, and the other input E6 of switch IC3A is connected to the output of sensor 15 via a variable resistor R16. Advantageously, the E6 input is biased by means of biasing resistors R17 and R18 connected as shown. Variable resistor R16 allows the maximum speed limit to be varied. Advantageously, the output of comparator switch IC3A transitions from low to high when the magnitude of the voltage at input E5 becomes greater than the magnitude of the voltage at input E6, and transitions from high to low when the voltage at input E5 becomes less than the voltage at input E6. The servomotor amplifiers advantageously comprise complementary transistors T5 and T6, and T7 and T8, respectively, connected as shown. It will be noted that the transistors are interconnected such that when switch IC3A is off, switch IC3B is biased on. Advantageously, protective Zener diodes D8 and D9 are connected across servomotor 7, and a transistor current limiting switch, comprising transistor T4, resistors R21 and R22, and diodes D5 and D6 connected as shown, is connected in series with the drive amplifiers to limit the current to servomotor 7 when cam 19A has been displaced to the limit of its displacement.

Input E3 of comparator switch IC3B, which corresponds to input E5 of switch IC3A, is connected to a predetermined voltage signal provided by resistors R25 and R26 connected as a voltage divider, as shown. Input E2 of switch IC3B, which corresponds to input E6 of switch IC3A, is connected via variable resistor R19, resistors R20 and R23, and a bypass capacitor C12 to the input E6 of switch IC3A such that negative feedback from the output of sensor 15 is provided to switch IC3B which turns switch IC3B on at a predetermined value of the voltage at input E6. Advantageously, the speed of servomotor 7 is reduced when displacing cam 19A away from slide member 18B by dividing the output of the corresponding drive amplifier. In the circuit of FIG. 4 this has been accomplished by connecting a resistor R24 between the junction of transistors T7 and T8 and the junction of resistor R23 and the E2 input to switch IC3B, as shown.

In operation, the output of switch IC3A is low and the output of switch IC3B is high when the voltage present at input E5 of switch IC3A, which corresponds either to the engine rotational speed or the vehicle speed depending on whether speedometer 6 is producing an output, as described hereinabove, is less than the voltage present at switch IC3A input E6. In this condition of the bridge circuit, servomotor 7 is actuated to displace cam 19A toward the uppermost position thereof. Displacement of slide member 18B by throttle linkage 2 is thus unrestricted. It will be appreciated that the voltage at input E6 is at a maximum when slide member 18B is in the lowermost idling position thereof, and that the voltage at the E6 input decreases as slide member 18B is displaced in a speed increasing direction. Hence, as speed increases, the voltages at inputs E5 and E6 converge. When the voltage at input E5 exceeds the voltage at input E6, switch IC3A switches on, producing a high output, and switch IC3B switches off, producing a low output. Servomotor 7 is thus actuated to displace cam 19A toward slide member 18B. When cam 19A contacts projection 21 on slide member 18B, slide member 18B and thus control element 16 are displaced toward the idling position, which causes the voltage at input E5 to decrease and the voltage at input E6 to increase. Feedback variable resistor R19 is adjusted such that when the voltage at input E6 equals the voltage at input E5, switch IC3B turns on. Since both servomotor drive amplifiers are then actuated, servomotor 7 stops. As long as the voltage at input E5 does not decrease below the voltage present at input E6, cam 19A remains at a predetermined speed limiting position intermediate the limit positions thereof, and actuation of throttle linkage 2 is ineffective to advance slide member 18B and thus carburetor control element 16 to a greater speed increasing position. When throttle linkage 2 is actuated to reduce the engine/vehicle speed below the predetermined maximum, the voltage at input E5 falls below the voltage at input E6 and switch IC3A turns off. Switch IC3B remains on the cam 19A is thus again displaced away from slide member 18B. Displacement of slide member 18B is again unrestricted until a further attempt is made to exceed the predetermined speed limit and the voltage at input E5 again exceeds the voltage at input E6, which causes servomotor 7 to again displace cam 19A to the speed limiting position in the manner described hereinabove.

Transistor T4, resistor 21 and diodes D5 and D6 are serving as a current-limitation to the servomotor 7 when it reaches its extreme positions.

I will be appreciated that switch system 3 advantageously is housed within carburetor housing 24 in a sealed off space (not shown). Values of the various circuit components described hereinabove which have proven advantageous are as follows (resistances are given in ohms, and capacitances are given in microfarads):

R1=470
R2, R8, R9, R15, R17, R18,=10K
R3, R4, R20, R23, R24,=100K
R5=68K
R6=22K
R7, R11, R22,=1K
R10, R12=47K
R13, R14=50K
R16, R19=220K
R25=15K
R21=82
R26=4.7K
C1=470
C2, C5=10
C3, C4, C6, C8, C9 =0.01
C7=0.068
C10, C11=2.2
C12=0.022
D1=SCWB 10 B80 C1500
D2, D3, D8, D9=RPD15
D4, D5, D6, D7=1N4148
T1=BD 201
T2, T3=BC 546
T4=BC 328
T5, T7=BC 546
T6, T8=BC 556
IC1=TDD 16105
IC2=NE 555
IC3A, IC3B=LM 358

Figure 5:
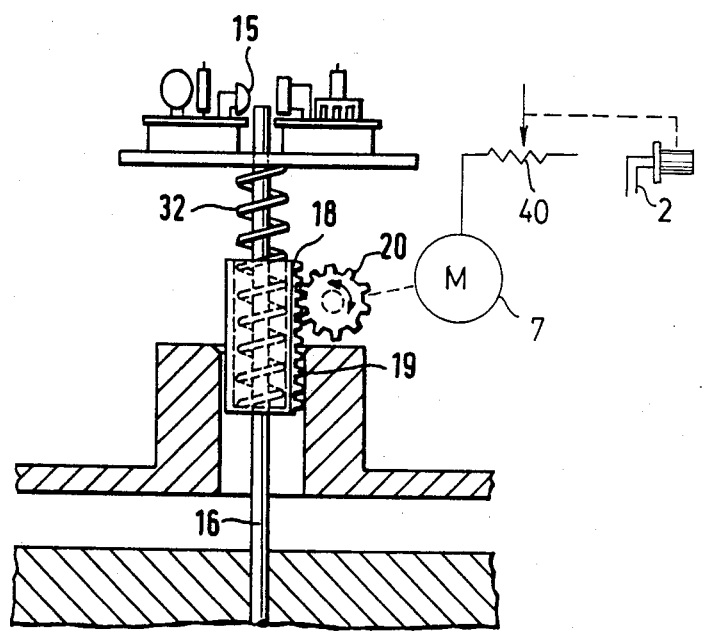
FIG. 5 is a schematic diagram of a portion of a third embodiment of a carburetor constructed in accordance with the present invention.

It is also to be noted that the carburetor constructed in accordance with the present invention need not have two slide members as described hereinabove. As shown in FIG. 5, a carburetor according to the present invention advantageously can have a single slide member 18 which is connected to control element 16. Advantageously, slide member 18 is provided with a toothed edge constituting a rack 19 which cooperates with driving pinion 20 driven by servomotor 7. A spring 32 advantageously is provided which urges slide member 18 toward the idle position thereof and thus performs an automatic speed limiting backup function in the event current to servomotor 7 fails. Servomotor 7 advantageously is controlled by a conventional control circuit (not shown) which is responsive to actuation of throttle linkage 2 such that slide member 18 is displaced according to actuation of linkage 2 until a predetermined limit is reached which deactivates servomotor 7 from further speed increasing displacement of slide member 18. Advantageously, a conventional sensor, such as photoelectric sensor 15 described hereinabove or a potentiometer 40, as shown in FIG. 5 is provided which produces an output proportional to the degree of actuation of the throttle control for actuating servomotor 7. Advantageously, the control circuit comprises a conventional limit switch (not shown) which is responsive both to vehicle and to engine speed dependent control signals. This embodiment of the present invention has the advantage of being compact and requiring little design effort. The servomotor is not required to exert large forces. Only the force of spring 32 must be overcome. It will be appreciated that slide member 18 need not be piston shaped. In principle a plate or valve can be controlled. Similarly, a rack and pinion arrangement is not essential for displacement of the sliding member. For example, a lifting magnet or a bimetal spring can also be employed.

It will be appreciated by those of ordinary skill in the art that the present invention is not restricted to the disclosed preferred embodiments and that modifications and changes can be made within the scope of the invention. It will be appreciated that the speed governing system of the present invention can also be used in passenger cars, although its advantages are most apparent with respect to small motorcycles. Such motorcycles equipped with the present invention can be provided with larger motors without fear that the engines can be altered to exceed the speed limits prescribed thereof. Moreover, the present invention is readily adapted to different vehicle types and speed limits.

We claim:

1. Apparatus for governing the speed of a motor vehicle having an engine equipped with a carburetor which includes a carburetor jet needle controlling the flow of fuel, said apparatus comprising a sliding member connected to said needle and responsive to action by a driver for actuating said needle, means for limiting displacement of said sliding member and electronic switch means selectively responsive to engine speed when vehicle speed is below a preselected value and to the vehicle speed when vehicle speed is above said preselected value for controlling said displacement limiting means to limit the response of the needle to driver actuation.

2. The apparatus of claim 1 wherein said displacement limiting means comprises a servomotor and said switch means comprises electronic means for producing at least one control signal for said servomotor.

3. The apparatus of claim 2 wherein said driver actuated means comprises first and second sliding members connected by spring means and coaxially disposed with respect to each other within the carburetor, said first sliding member being connected to said needle and said second sliding member being connected to a driver actuated throttle linkage.

4. Apparatus for governing the speed of a motor vehicle having an engine equipped with a carburetor which includes a jet needle controlling the flow of fuel, said apparatus comprising:
first and second sliding members connected by spring means and coaxially disposed with respect to each other within the carburetor, said first sliding member being connected to said jet needle and said second sliding member being connected to a driver actuated throttle linkage;
a servomotor;
axially displaceable means coupled to said servomotor for limiting displacement of said first sliding member in a speed increasing direction; and
switch means selectively responsive to one of engine speed and vehicle speed for producing at least one control signal for said servomotor to limit the response of said first sliding member to the driver actuated throttle linkage.

5. The apparatus of claim 4 wherein said axially displaceable means comprises a rack driven by a pinion connected to said servomotor and means connected to said first slide member for cooperating with said rack.

6. The apparatus of claim 3, 4 or 5 wherein said sensor means comprises a photoelectric sensor having barrier means coupled to said first sliding member for regulating the amount of light detected in proportion to the position of said first sliding member.

7. The apparatus of any one of the claims 3, 4 or 5 wherein said control signal producing means comprises first converter means for converting engine speed signals into engine speed control signals and second converter means for converting vehicle speed signals into vehicle speed control signals, said first and second converter means being connected to said displacement limiting means by an electronic switch.

8. The apparatus of claim 7 wherein said second converter means comprises contactless sensor means for producing vehicle speed dependent signals.

9. The apparatus of claim 8 wherein said automatic means and the carburetor are housed as a unit with said electronic switch means housed in a sealed space.

10. The apparatus of claim 7 wherein said electronic switch comprises a transistor switch responsive to the presence of said vehicle speed control signals for disabling said first converter means.

11. The apparatus of claim 10 wherein said switch means comprises means for comparing said engine speed or vehicle speed control signals with a variable reference signal and producing an output proportional to the difference therebetween.

12. The apparatus of claim 11 wherein said control signal producing means comprises sensor means for determining the position of said first sliding member.

13. The apparatus of claim 12 wherein said switch means comprises bridge switching means responsive to the difference between said reference signal and said engine speed or vehicle speed control signals and to the output of said sensor means for driving said servomotor.

14. The apparatus of claim 13 wherein said bridge switching means comprises first and second transistor drive amplifiers respectively controlled by first and second bridge switch networks for driving said servomotor in opposite directions.

15. The apparatus of claim 14 wherein said bridge switching means further comprises current limiting switch means connected in series with said drive amplifiers and said servomotor.

* * * * *